(12) United States Patent
Amer et al.

(10) Patent No.: US 12,148,166 B2
(45) Date of Patent: Nov. 19, 2024

(54) UPDATING BOUNDARY SEGMENTATIONS

(71) Applicant: Siemens Healthcare GmbH, Erlangen (DE)

(72) Inventors: Karim Amer, Cairo (EG); Noha El-Zehiry, Plainsboro, NJ (US); Gareth Funka-Lea, Princeton, NJ (US); Athira Jane Jacob, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 357 days.

(21) Appl. No.: 17/635,105

(22) PCT Filed: Mar. 6, 2020

(86) PCT No.: PCT/EP2020/056041
§ 371 (c)(1),
(2) Date: Feb. 14, 2022

(87) PCT Pub. No.: WO2021/032325
PCT Pub. Date: Feb. 25, 2021

(65) Prior Publication Data
US 2022/0301177 A1    Sep. 22, 2022

Related U.S. Application Data

(60) Provisional application No. 62/887,743, filed on Aug. 16, 2019.

(51) Int. Cl.
*G06T 7/00* (2017.01)
*G06T 7/12* (2017.01)

(52) U.S. Cl.
CPC .............. *G06T 7/12* (2017.01); *G06T 7/0012* (2013.01); *G06T 2207/10028* (2013.01); *G06T 2207/30048* (2013.01); *G06T 2207/30168* (2013.01)

(58) Field of Classification Search
CPC ........... G06T 7/12; G06T 7/0012; G06T 7/00; G06T 2207/10028; G06T 2207/30048; G06T 2207/30168
See application file for complete search history.

(56) References Cited

U.S. PATENT DOCUMENTS

2015/0043797 A1* 2/2015 Ranjan ..................... G06T 7/12
382/131
2017/0301085 A1 10/2017 Riklin Raviv et al.

OTHER PUBLICATIONS

Cha, JeongHee, and GyeYoung Kim. "Enhanced snake algorithm using the proximal edge search method." International Conference on Computational Science and its Applications. Springer, Berlin, Heidelberg, 2007. pp. 1083-1095.

(Continued)

*Primary Examiner* — Tuan H Nguyen
(74) *Attorney, Agent, or Firm* — Lempia Summerfield Katz LLC (57) ABSTRACT

A computer-implemented method for updating a boundary segmentation, the method including receiving image data and an original boundary segmentation including a plurality of boundary points. A plurality of edges in the image data is detected and used to generate an edge map. A confidence for a boundary point in the original boundary segmentation is computed where the confidence is based on a distance between the boundary point and an edge point associated with at least one of the plurality of edges of the edge map, and based on the confidence a classification of the boundary point is determined. An updated boundary segmentation based on the classification of the boundary point is generated and then output.

14 Claims, 4 Drawing Sheets

(56) References Cited

OTHER PUBLICATIONS

Huang, Zhuan Qing, and Zhuhan Jiang. "Object contour refinement via confidence voting." 2006 8th international Conference on Signal Processing. vol. 2. IEEE, 2006. pp. 1-4.

* cited by examiner

UPDATING BOUNDARY SEGMENTATIONS

CROSS REFERENCE TO RELATED APPLICATIONS

This present patent document is a § 371 nationalization of PCT Application Serial Number PCT/EP2020/056041, filed Mar. 6, 2020, designating the United States, which claims the benefit of the filing date under 35 U.S.C. § 119(e) of U.S. Provisional Application Ser. No. 62/887,743 filed on Aug. 16, 2019, both of which are hereby incorporated in their entirety by reference.

FIELD

Embodiments relate to processing medical image data to update object boundaries, for example, to improve the accuracy of detected object boundaries.

BACKGROUND

Medical imaging techniques may be used to obtain information regarding a human or animal body. For example, an X-ray image may be used to detect and classify bone fractures. In another example, Magnetic Resonance Imaging (MRI) may be used to image tissues of the body. Similarly, ultrasound imaging may be used to image tissues of the body quickly and monitor changes over time.

Image data, such as ultrasound image data may be used to detect abnormalities in soft tissues such as atrial deformities of the heart, or deformities in other organs such as the kidneys. Ultrasound imaging provides snapshots of the organ to be taken at a given time, and manual analysis to be performed on the recorded image data in order to detect such abnormalities.

While manual detection provides a suitable rate of success in the detection of the abnormalities it is time-consuming, and sometimes may be inaccurate. Automated detection techniques have been developed however such techniques are limited in their abilities to provide accurate boundary detection.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide accurate boundary detection and segmentation.

Embodiments provide a computer-implemented method for updating a boundary segmentation, the method including receiving image data and an original boundary segmentation including a plurality of boundary points; detecting a plurality of edges in the image data to generate an edge map; computing a confidence for a boundary point in the original boundary segmentation, the confidence being based on a distance between the boundary point and an edge point associated with at least one of the plurality of edges of the edge map; determining a classification of the boundary point based on the computed confidence; generating an updated boundary segmentation based on the classification of the boundary point; and outputting the updated boundary segmentation.

Providing an updated/refined boundary segmentation provides a more accurate boundary segmentation to be provided without the need for professional intervention. Furthermore, using the classification information provides indications of the level of confidence to be shown to a professional such that the updated boundary segmentation is represented by an open boundary (where levels of confidence are assigned to portions of the boundary segmentation), and does not include a closed boundary as is the case with the original boundary segmentations provided as an input to the method.

The distance may be a minimum distance from the boundary point to the edge point. Determining the minimum distance may include analyzing at least one of a direction, a gradient, and a magnitude of an edge in the edge map; determining a likelihood value based on the analysis, where the likelihood value indicates whether the edge represents a boundary edge; and filtering the plurality of edges in the edge map based the likelihood value. This provides the updated boundary segmentation to be as accurate as possible, by providing that any adjustments are made based on the most likely edge of the edge map.

Classifying each boundary point may include, at least one of determining whether the confidence exceeds a predetermined threshold and determining the position of the confidence on a given scale. The predetermined threshold and/or the given scale may be based on data associated with an object represented in the image data. This provides that only confidences that are above a given threshold or position on the given scale are used when updating the boundary segmentation, thereby improving overall accuracy.

Generating an updated boundary segmentation may include analyzing the boundary point to determine a group of boundary points representative of a connected component of the boundary segmentation; determining at least one characteristic of the connected component; and refining the classification of the group of boundary points based on the at least one characteristic of the connected component.

A computer-implemented method may be used where the image data is three-dimensional image data.

Detecting the plurality of edges may include applying a contrast differential to the image data. This provides edges to be detected using little additional processing power while providing accurate representations of the edges present in the image data.

The confidence may be a confidence map. Determining the classification may include thresholding the confidence map to obtain a binary classification value. This provides a plurality of individual confidence values making up the confidence map to be assessed at once to determine a binary classification value.

The image data may include at least one of ultrasound image data; x-ray image data; magnetic resonance imaging image data; computed-tomography image data; and positron electron therapy image data.

The computer-implemented method may further include determining an accuracy characteristic associated with the original boundary segmentation; and providing an indication that a quality of the original boundary segmentation falls below a given accuracy based on the accuracy characteristic. This provides that only image data that exceeds a given threshold is used to generate the updated boundary segmentation, thereby reducing the likelihood of incorrect boundary segmentations being produced.

Embodiments provide a system for updating a boundary segmentation, a system including a first interface configured to receive image data and an original boundary segmentation; a detection unit configured to detect a plurality of edges in the image data and generate an edge map; a computation unit configured to compute a confidence for a boundary point in the original boundary segmentation, the confidence being based on a distance between the boundary point and an edge point associated with at least one of the plurality of edges of the edge map; a classification unit configured to determine a classification of the boundary point based on the computed confidence; a generation unit configured to generate an updated boundary segmentation based on the classification the boundary point; and a second interface configured to output the updated boundary segmentation.

Providing an updated/refined boundary segmentation provides a more accurate boundary segmentation to be provided without the need for professional intervention. Furthermore, using the classification information provides indications of the level of confidence to be shown to a professional such that the updated boundary segmentation does not include a closed boundary as is the case with the original boundary segmentations provided as an input to the processor.

The classification unit may include a determination unit for determining a classification of at least one of the boundary points. The determination unit is arranged to determine whether the confidence exceeds a predetermined threshold, or to determine the position of the confidence on a given scale. This provides that only confidences that are above a given threshold or position on the given scale are used when updating the boundary segmentation, thereby improving overall accuracy.

The image data may be three-dimensional image data.

The system may further include a quality assessment unit configured to determine an accuracy characteristic associated with the original boundary segmentation, and to provide an indication that a quality of the original boundary segmentation falls below a given accuracy based on the accuracy characteristic. This provides that only image data that exceeds a given threshold is used to generate the updated boundary segmentation, thereby reducing the likelihood of incorrect boundary segmentations being produced.

Embodiments provide a non-transitory computer-readable storage medium including a set of computer-readable instructions stored thereon that, when executed by at least one processor cause the processor to update a boundary segmentation, the instructions including receiving image data, and an original boundary segmentation including a plurality of boundary points; detecting a plurality of edges in the image data to generate an edge map; computing a confidence for a boundary point in the original boundary segmentation, the confidence being based on a distance between the boundary point and an edge point associated with at least one of the plurality of edges of the edge map; determining a classification of the boundary point based on the computed confidence; generating an updated boundary segmentation based on the classification of the boundary point; and outputting the updated boundary segmentation.

BRIEF DESCRIPTION OF THE FIGURES

The above-mentioned attributes, features and advantages and the manner of achieving them will become more apparent and understandable with the following description of embodiments with reference to the accompanying drawings in which like reference numerals are used to denote like features.

DETAILED DESCRIPTION

Figure 1:
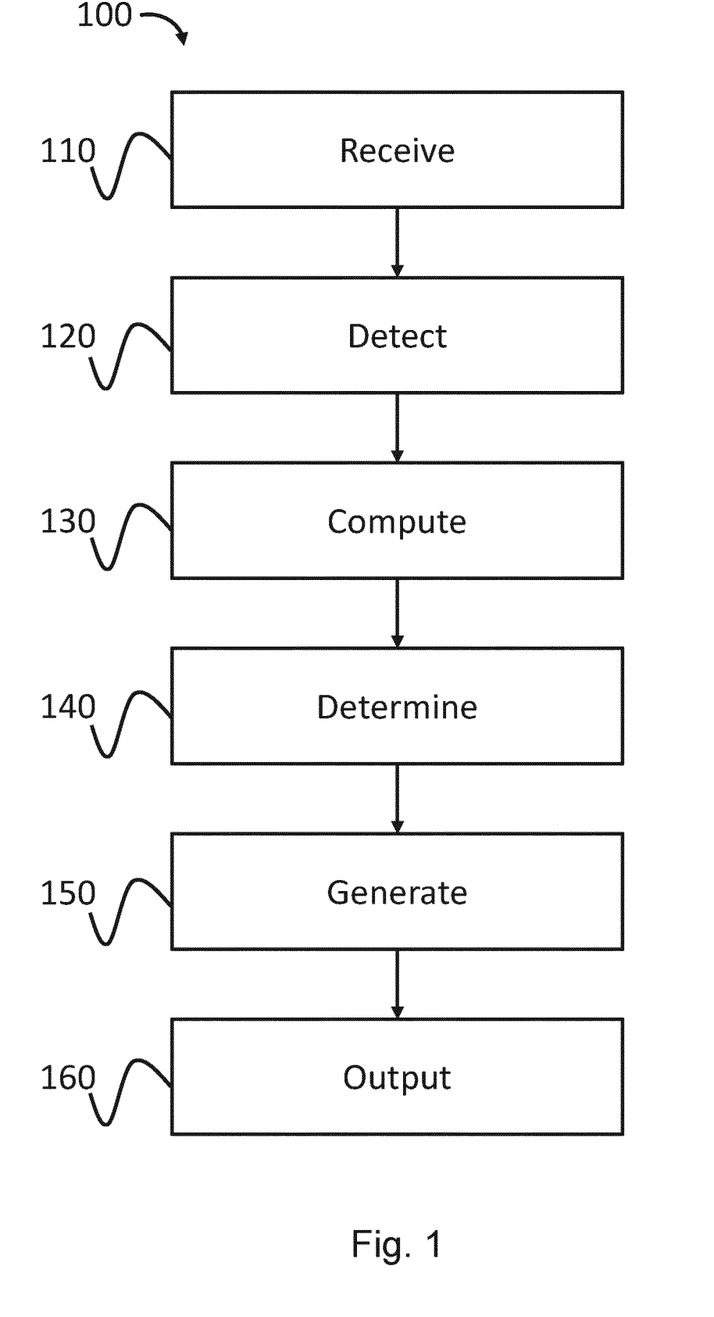
FIG. 1 depicts a flow diagram illustrating a method for updating a boundary segmentation associated with medical image data, according to an embodiment.

FIG. 1 depicts a flow diagram illustrating a computer-implemented method 100 for updating a boundary associated with medical image data, according to an embodiment. At block 110, of the method 100, image data is received at a data processing system. A boundary segmentation based on the image data is also received at the data processing system. The image data may be medical image data captured by a medical device such as ultrasound image data. It will be appreciated that in other examples the image data is any of Magnetic Resonance Imaging image data, X-ray image data, computed tomography scan data, or any other kind of medical image data that may be used to indicate a boundary segmentation associated with an organ, or part of an organ. As such, the medical image data is capable of being obtained using different modalities.

The medical image data may represent an image volume within the human or animal body. For example, the medical image data may include a set of two dimensional (2D) images in one or more imaging planes (e.g., the sagittal plane, coronal plane, and transverse plane). It will be understood that each 2D image may be made up of a number of pixels. In some examples, the medical image data may have been acquired using a three-dimensional (3D) acquisition process and maybe in a 3D format. In the 3D format example, the image may be made up of a number of voxels. In the following discussions, examples are provided in which the medical image data is ultrasound image data. However, other types of image data may be used.

The boundary segmentation received by the data processing system at block 110 is a boundary segmentation based on the medical image data and may be obtained via a pre-processing step. The pre-processing step may be a process developed using a machine learning algorithm, or an alternative method based on image recognition and processing algorithms, for example. Boundary segmentations obtained by such methods are obtained using a mask that delineates the edges of objects within the medical image data, and as such represent the object as existing within a closed boundary regardless of the presence or absence of a local edge in that region of the medical image data. As such, the boundary segmentation includes a plurality of boundary points indicative of points that are identified, as part of the pre-processing, as forming, or having a high probability of forming, part of the boundary segmentation of an object within the medical image data. The boundary points form a continuous, unbroken segmentation. For example, when the medical image data is obtained using an ultrasound modality, the medical image data commonly contains two hard edges indicative of the periphery of the ultrasound waves used to generate the medical image data. The local edges forming part of the boundary segmentation, are in fact artifacts associated with the modality used, and not artifacts associated with the object the medical image data is representing. As such, creating a closed boundary that includes the local edges may lead to the misinterpretation of the results of any boundary segmentations. Therefore, further interpretation and analysis are required to determine an accurate boundary segmentation representing the object.

Following the receipt of the medical image data and boundary segmentation, at block 120 a plurality of edges is detected within the medical image data. The detected edges are combined to create an edge map indicative of strong information content in the medical image data that may represent the proximity of a boundary segmentation associated with the object within the medical image data. There are a number of methods of detecting edges within image data, one example of which is the application of a contrast differential that detects when there is a sharp change in the contrast of the image. It will be appreciated that there are a number of other methods for detecting edges within image data, and in medical image data for example, that may be used to generate an edge map for use by the method 100.

Some imaging modalities produce medical image data that is not of high quality, and that contains a number of artifacts and other noise, for example, due to movement of an ultrasound probe. As such, an edge detection methodology, such as the application of a contrast differential, may result in an edge map including edge indications where no edge exists. To combat such imperfections, a post-processing step, such as smoothing may be used to reduce the amount of noise prior to the generation of the edge map. As a result of the smoothing step any artifacts or other imperfections that are not representative of the object of the medical image data and that have been introduced due to, for example, the movement of the sensor used to capture the data may be minimized or reduced and discounted when determining whether an edge is present. This leads to a more accurate edge map and as a result a more accurate boundary segmentation following the application of the method 100.

In some examples, for example where imaging modalities are used that may result in low-quality medical image data, a further step of determining whether the medical imaging data is suitable for providing a boundary segmentation is undertaken. In such examples, an accuracy characteristic is determined. The accuracy characteristic may be based on a number of factors, including but not limited to the amount of noise within medical image data provided by the imaging modality. If the accuracy characteristic falls below a given accuracy, an indication is then provided to a user of the data processing system to prompt the user to recapture the medical image data again, for example using an alternative imaging modality.

Figure 3A:
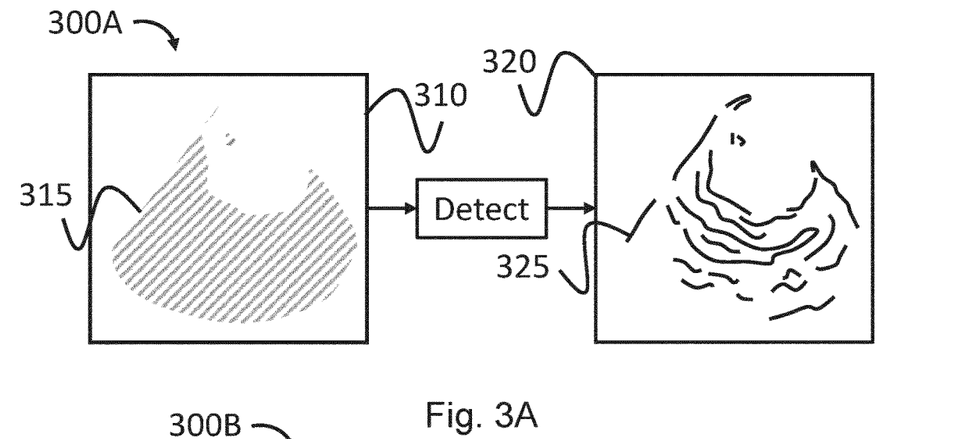
FIG. 3A depicts a schematic diagram illustrating a first process performed as part of an updating process according to an embodiment.

FIG. 3A depicts a schematic diagram illustrating the edge detection process 300A, described above in relation to block 120 The edge detection process 300A includes detecting edges within medical image data 310, that as mentioned above may be medical image data 310 containing a representation 315 of an object captured by a given imaging modality, such as ultrasound. Edges 325 within the medical image data 310 are detected, for example by applying a contrast differential to the medical image data 310 that determines where an edge 325 exists based on the level of difference in the contrast of given areas of the representation 315. The edges 325 are then used to generate an edge map 320 that may have been smoothed to remove artifacts that are present as a result of low-quality medical image data 310 or as a result of the imaging modality used.

Following the detection of edges and generation of the edge map, at block 130, a confidence for a boundary point within the original boundary segmentation is computed. The confidence is computed based on any number of factors, including a distance between the boundary point and an edge point associated with at least one of the edges of the edge map previously generated. The distance may be represented by a distance metric. The distance and the associated confidence may be based on a minimum distance between the boundary point all the edge points in the edge map. That is, the smaller the distance between a boundary point and an edge point the higher the confidence.

To determine whether the distance from a boundary point to an edge point on one of the edges of the edge map is a minimum distance, further analysis may be undertaken. To minimize or reduce the number of edges from which to determine the distance, a filter may be applied to the edge map to reduce the number of edges to consider. To determine which edges of the edge map to filter, each edge may be analyzed based on any one or more of the direction of the edge, the gradient of the edge, and the magnitude of the edge. For example, where the detected edge is inside an original boundary that edge may be discarded, similarly, if the edge has a low gradient those too may be discarded. Based on this analysis a likelihood value attributed to the edge is determined, where the likelihood value is indicative of whether the edge is to be considered when determining whether a distance between the boundary point and an edge point associated with the edge is a minimum distance. Based on the likelihood value, a filter is then applied to the edge map to remove edges that have a low likelihood value.

The confidence may be determined as a binary choice; that is a boundary point may have a confidence of one if the distance metric is below a given threshold value. Conversely, if the distance metric is above a given threshold value, the boundary point may have a confidence of zero. Alternatively, the confidence may exist on a scale of values, such that the distance metric itself is used to determine the position of the confidence on a given scale such that the lower the distance metric, the higher the confidence and vice versa. As such, the confidence may be an individual confidence value. In a further example, the confidence may be represented as a confidence map including values of 1 for high confidence and values of 0 for low confidence, alternatively, the confidences may include a scape of values varying from 0 to 1. The confidence may be computed based on the proximity of the edge map or based on other similarity methods. In some examples, the confidence map may be output and used to indicate individual confidence values or compared to a predetermined threshold value. The threshold value may be based on the organ, modality used, or patient population, alternatively the threshold value may be user configurable so as to obtain different segmentation with different levels of confidence.

The scale used and/or the confidence threshold may be based on known data associated with the object of the medical image data. For example, where it is known that the medical image data is an intracardial echo, the scale and threshold are tailored to medical imaging data associated with the heart. Alternatively, where the medical image data is an image of a kidney, the scale and threshold are tailored for the kidney. This provides more accurate boundary segmentations to be produced since the confidence is adjusted and tailored to the particular object of the medical image data.

Figure 3B:
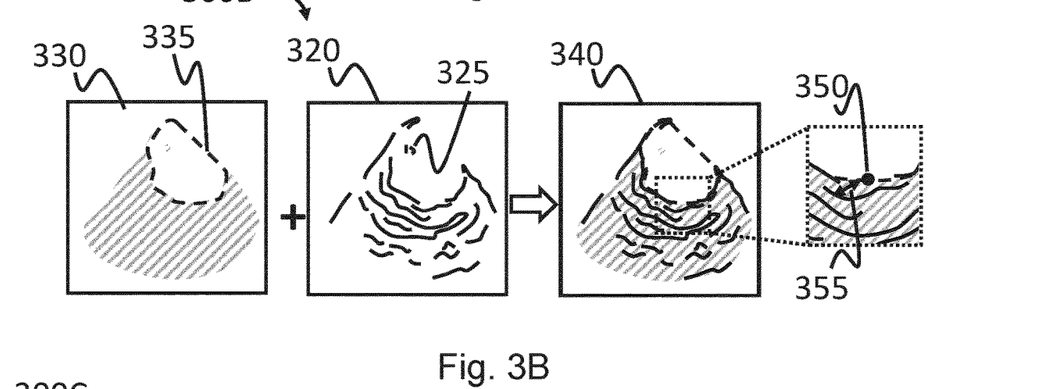
FIG. 3B depicts a schematic diagram illustrating a second process performed as part of an updating process according to an embodiment.

FIG. 3B is a schematic diagram illustrating a distance calculation process 300B. The distance calculation process 300B relates to the determination of the distance between a boundary point 350 and an edge point associated with an edge in the edge map 320. The boundary point is obtained from an original boundary segmentation 330 provided as an input, the original boundary segmentation 330 is based on the medical image data 310 and delineates an approximation 335 of where the boundary of the object of the medical image data 310 is assumed to be. The approximation 335 may be generated in a pre-processing step that may include an automated method based on a machine learning algorithm.

The edge map 320 and the original boundary segmentation are combined 340 and used to determine the distance 355 between a boundary point 350 lying on the approximation 335 and an edge point on an edge 325 of the edge map 320. The distance 355 and the associated confidence may be based on determining a minimum distance between the boundary point and an edge point, and as such multiple calculations may be undertaken to determine what is the minimum distance by comparing the boundary point 350 to multiple edge points.

Following the computation of the confidence, at block 140 a classification of the boundary point is determined based on its ascribed confidence. The classification indicates that the boundary point is likely part of the boundary segmentation representing an object of the medical image data, or in some examples, the classification indicates a level of trust that the boundary point belongs to the boundary segmentation. Furthermore, where the confidence is sufficiently low, the boundary point may be classified such that it is indicated that it does not belong to the boundary segmentation.

Based on the classifications determined, at block 150, an updated boundary segmentation is generated. In some examples, multiple boundary points are classified and used to generate the updated boundary segmentation. As such, generating the updated boundary segmentation may include analyzing the boundary points to determine one or more groups of boundary points, where the groups of boundary points are representative of a connected component of the boundary segmentation. The connected component is a section of the boundary segmentation where the classification of boundary points does not vary from point to point. Once a connected component of the boundary segmentation has been obtained, one or more characteristics of the connected component may be determined. These characteristics include the number of boundary points making up the connected component and the size of the connected component. Multiple connected components may be obtained for a single boundary segmentation, forming a refined and updated boundary segmentation that more accurately reflects the object of the medical image data. The classification of individual boundary points, and as a result the connected components represented by groups of boundary points, are also refined based on the characteristics. For example, the total length of each connected component may be calculated, such that where there is a first connected component that has a first classification, flanked on either side by connected components having a longer length than the first connected component, and a second classification, the classification of the first connected component may be adjusted and/or refined such that it matches the second classification.

Figure 3C:
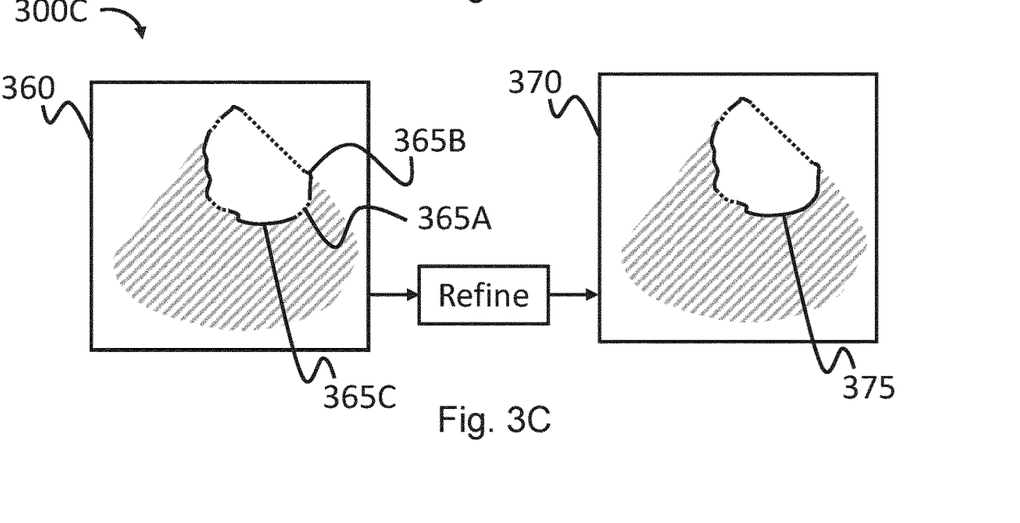
FIG. 3C depicts a schematic diagram illustrating a third process performed as part of an updating process according to an embodiment.

FIG. 3C is a schematic diagram illustrating a process 300C for generating the updated boundary segmentation based on the connected component. An initial estimation 360 of the updated boundary segmentation is provided based on the confidence calculated. The initial estimation 360 may include multiple connected components 365A, 365B, 365C. Each of the connected components 365A, 365B, 365C may include an indication of the confidence that they form part of the updated boundary segmentation. As shown in FIG. 3C this maybe by using different styles of line to indicate different confidences, but it will be appreciated that other methods may be used such as changing the weight or color of the line.

In the example of FIG. 3C, components 365B, 365C that have a high confidence may be indicated with a solid line whereas components 365A that have a low confidence may be indicated by a dashed line. To generate the updated boundary segmentation, the characteristic values of each of the components 365A, 365B, 365C and their respective confidences are compared. The style, color, and/or weight, etc. of the line representing the component 365A, 365B, 365C may then be updated accordingly to produce a refined boundary segmentation.

The refined boundary segmentation 370 includes updated components 375. In this example, since the components 365B, 365C connected to component 365A have a high confidence and are significantly longer than component 365A, then the confidence of component 365A is updated such that a single continuous component 375 following the same path of components 365A, 365B, 365C is provided as part of the updated and refined boundary segmentation. It will be appreciated that characteristics other than the length of the components may be used to determine whether to adjust individual component confidences.

While the above example has been described with reference to 2D medical image data, the method may also be used to refine, or update 3D boundary segmentations generated from 3D medical image data. In such cases, not only are confidences ascribed to boundary points in a 2D domain, but distance metrics may be based on a 3D representation of the respective edges. To do this, multiple slices of the 3D image data may be obtained in an axial direction, and adjacent slices may be analyzed to determine the confidence across the multiple slices rather than being based on a single slice of the 3D medical image data. Alternatively, the boundary may be represented as a 3D surface, and boundary points may be represented using a 3D coordinate system.

Following the generation of the updated boundary segmentation, at block 160, the updated boundary segmentation is output to a device of the data processing system. This may be a display or other computing device enabling a user of the data processing system to view and further analyze the updated boundary segmentation.

Figure 2:
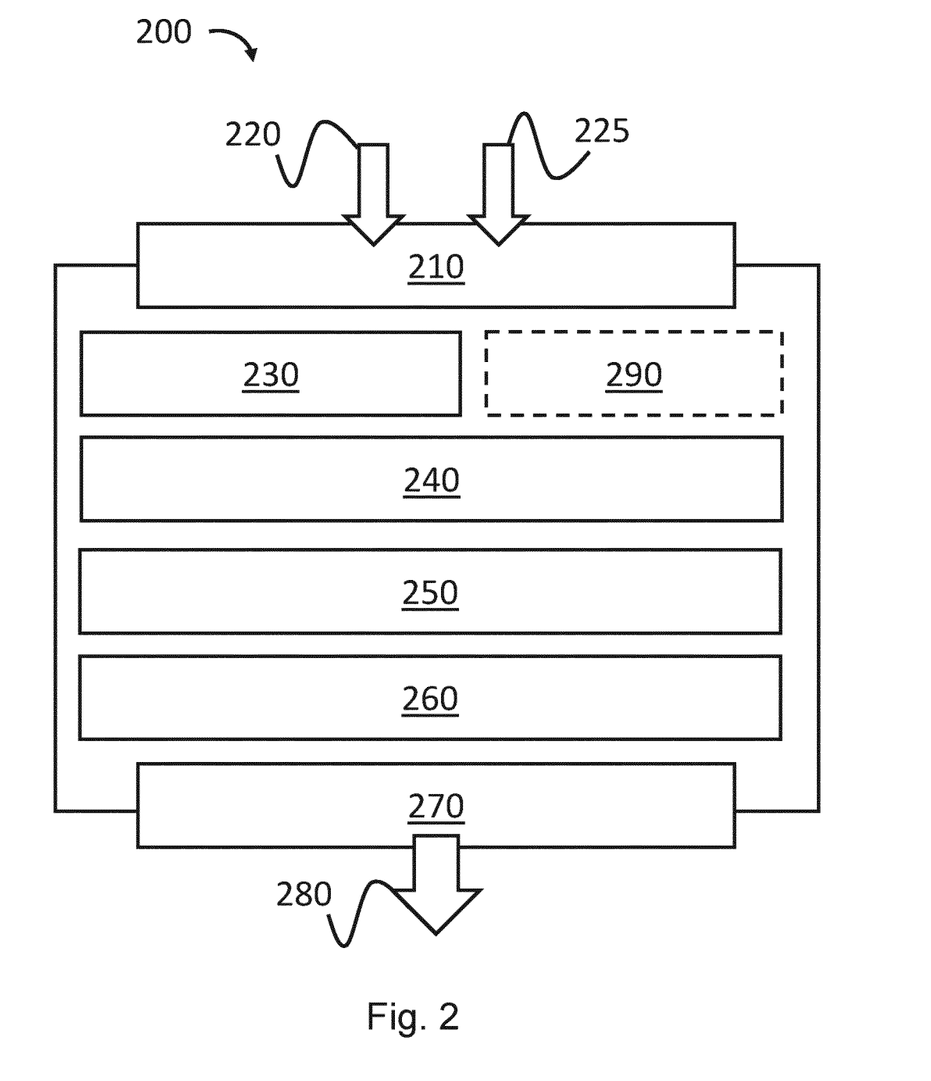
FIG. 2 depicts a schematic diagram illustrating a system according to an embodiment.

FIG. 2 is a schematic diagram illustrating a processor 200, according to an example. The processor 200 is arranged to execute the method described above with reference to FIG. 1 and may form part of the data processing system described above with reference to FIG. 1. The processor 200 may include multiple processing units, such as image signal processors (ISP), graphics processing units (GPU), general-purpose central processing units (CPU), or neural processing units (NPU). Furthermore, the processor 200 may exist alongside other components such as memory (not shown) used for storing instructions and/or data associated with the task of updating boundary segmentations. The memory may include a main memory, otherwise referred to as a 'primary memory'. The memory may be an external memory, in that the memory is external to the data processing system. For example, the memory may include 'off-chip' memory. The memory may have a greater storage capacity than the memory cache(s) of the processor 200. In some examples, the memory is included in the data processing system. For example, the memory may include 'on-chip' memory and be packaged alongside the processor 200 in a single 'system on a chip'. The memory may, for example, include a magnetic or optical disk and disk drive or a solid-state drive (SSD). In some examples, the memory includes a synchronous dynamic random-access memory (SDRAM). For example, the memory may include a double data rate synchronous dynamic random-access memory (DDR-SDRAM). The memory may be arranged to store the updated boundary segmentation output by the processor 200.

The processor 200 may be interconnected with other components of the data processing system, such as the sensor used to capture the medical image data, for example using system bus, although it will be appreciated that the processor and at least one of the other components of the data processing system may be directly connected to one another such that the output of one component is connected directly to the input of another component in a pipeline. This allows data to be transferred between the various components.

The processor 200 includes a first interface 210 that is configured to receive medical image data 220 and an original boundary segmentation 225. As mentioned previously, the original boundary segmentation 224 may be provided by an NPU or other processor (not shown) that forms part of the data processing system, and may, or may not exist alongside the processor 200 in the same 'system on a chip'. The processor 200 includes a detection unit 230 that is configured to detect a plurality of edges in the medical image data 220 and to generate an edge map as described with reference to block 120 of method 100.

The processor 200 further includes a computation unit 240 for computing a confidence for a boundary point in the original boundary segmentation 225 as described above with reference to block 130 of method 100.

A classification unit 250 is used to determine a classification of the boundary point based on the computed confidence as described above with reference to block 140 of method 100.

The processor 200 also includes a generation unit 260 for generating an updated boundary segmentation based on the classification of individual boundary points as described above with reference to block 150 of method 100.

A second interface 270 forming part of the processor 200 is arranged to output the updated boundary segmentation 280. The updated boundary segmentation 280 may be provided to a display or other computing device enabling a user of the data processing system to view and/or undertake further analysis.

In some examples, the processor 200 also includes a quality assessment unit 290. The quality assessment unit 290 is used where imaging modalities that result in low quality medical image data are used to provide the medical image data, a further step of determining whether the medical imaging data is suitable for providing a boundary segmentation may be undertaken. In such examples, an accuracy characteristic is determined. The accuracy characteristic may be based on a number of factors, including but not limited to the amount of noise within medical image data provided by the imaging modality. If the accuracy characteristic falls below a given accuracy, an indication is then provided to a user of the data processing system so that they are able to recapture the medical image data again, possibly using an alternative imaging modality.

As mentioned above in relation to method 100, the medical image data 200 may be 3D medical image data, and the processor 200 may be arranged to generate an updated 3D boundary segmentation, by considering edges detected in multiple slices of the 3D medical image data taken in an axial direction.

Figure 4A:
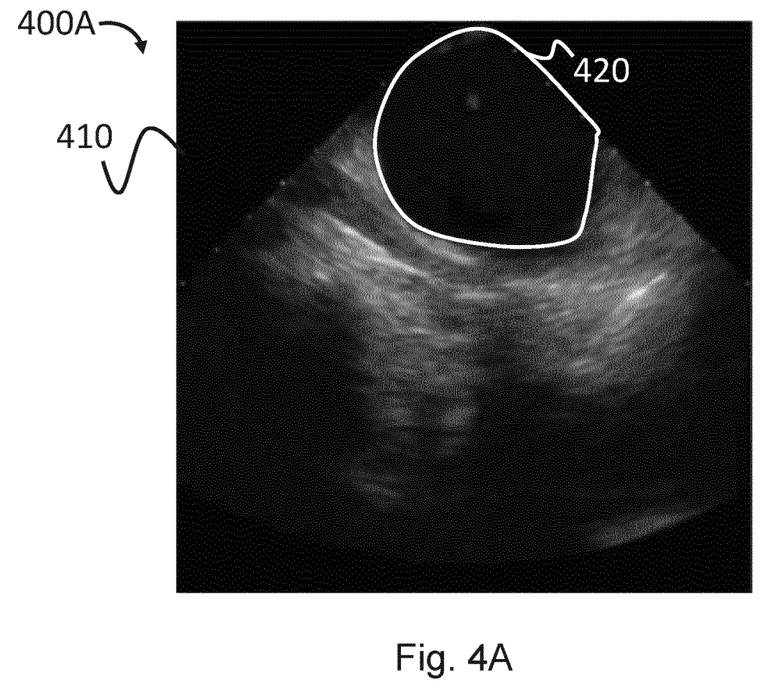
FIG. 4A depicts a medical image with a boundary segmentation of the left endocardial border of the heart provided as an input to the updating process according to an embodiment.

FIG. 4A shows a medical image 400 with an original boundary segmentation 410 of the left endocardial border of the heart provided as an input to the updating process. The original boundary segmentation 410 is a closed segmentation and has been generated by a pre-processing step that may include applying a machine-learning algorithm to the medical image 400.

Figure 4B:
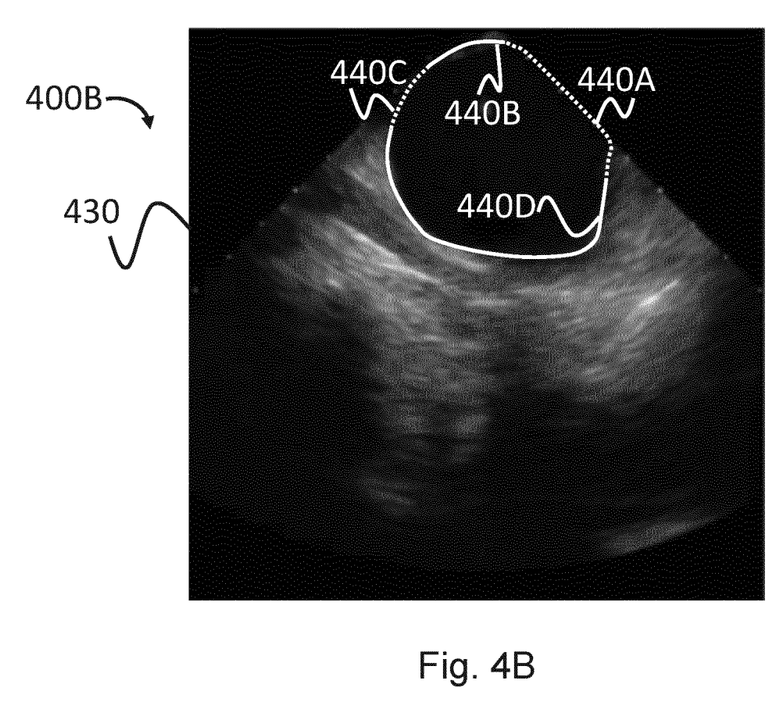
FIG. 4B depicts the medical image of FIG. 4A with a boundary segmentation of the left endocardial border of the heart outputted by the updating process according to an embodiment.

Conversely, FIG. 4B shows the same medical image 400 with an updated boundary segmentation of the left endocardial border of the heart outputted by the updating process. The updated boundary segmentation is an open segmentation including, four connected components 420A, 420B, 420C, 420D each indicating a level of confidence as indicated by the method, and as described above. The indications provided may allow a user, such as a medical professional, to easily identify with some confidence which parts of the medical image 400 show the object, and that do not.

While the invention has been illustrated and described in detail in the context of specific examples, the invention is not limited to the disclosed examples. Other variations may be deduced by those skilled in the art without leaving the scope of protection of the claimed invention.

In summary, disclosed is a computer-implemented method, processor, and computer-implemented storage medium for updating a boundary segmentation, the method including receiving image data and an original boundary segmentation including a plurality of boundary points. A plurality of edges in the image data is detected and used to generate an edge map. A confidence for a boundary point in the original boundary segmentation is computed where the confidence is based on a distance between the boundary point and an edge point associated with at least one of the plurality of edges of the edge map, and based on the confidence a classification of the boundary point is determined. An updated boundary segmentation based on the classification of the boundary point is generated and then output.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for updating a boundary segmentation, the method comprising:
   receiving image data and an original boundary segmentation comprising a plurality of boundary points;
   detecting a plurality of edges in the image data to generate an edge map;
   computing a confidence for a boundary point in the original boundary segmentation, the confidence based on a distance between the boundary point and an edge point associated with at least one of the plurality of edges of the edge map;
   determining a classification of the boundary point based on the computed confidence;
   generating an updated boundary segmentation based on the classification of the boundary point, wherein generating comprises:
      analyzing the boundary point to determine a group of boundary points representative of a connected component of the boundary segmentation;
      determining at least one characteristic of the connected component;
      refining the classification of the group of boundary points based on the at least one characteristic of the connected component; and
   outputting the updated boundary segmentation.

2. The computer-implemented method of claim 1, wherein the distance is a minimum distance from the boundary point to the edge point.

3. The computer-implemented method of claim 2, wherein determining the minimum distance comprises:
   analyzing at least one of a direction, a gradient, or a magnitude of an edge in the edge map;
   determining a likelihood value based on the analysis, where the likelihood value indicates whether the edge represents a boundary edge; and
   filtering the plurality of edges in the edge map based on the likelihood value.

4. The computer-implemented method of claim 1, wherein classifying each boundary point comprises, at least one of:
   determining whether the confidence exceeds a predetermined threshold; or
   determining a position of the confidence on a given scale.

5. The computer-implemented method of claim 4, wherein the predetermined threshold, the given scale, or the predetermined threshold and given scale are based on data associated with an object represented in the image data.

6. The computer-implemented method of claim 1, wherein the image data is three-dimensional image data.

7. The computer-implemented method of claim 1, wherein detecting the plurality of edges comprises applying a contrast differential to the image data.

8. The computer-implemented method of claim 1, wherein the confidence is a confidence map, and wherein determining the classification comprises thresholding the confidence map to obtain a binary classification value.

9. The computer-implemented method of claim 1 wherein the image data comprises at least one of: ultrasound image data, x-ray image data, magnetic resonance imaging image data, computed-tomography image data, or positron electron therapy image data.

10. The computer-implemented method of claim 1, further comprising:
    determining an accuracy characteristic associated with the original boundary segmentation; and
    providing an indication that a quality of the original boundary segmentation falls below a given accuracy based on the accuracy characteristic.

11. A system for updating a boundary segmentation, the system comprising:
    a first interface configured to receive image data and an original boundary segmentation;
    a detection unit configured to detect a plurality of edges in the image data and generate an edge map;
    a computation unit configured to compute a confidence for a boundary point in the original boundary segmentation, the confidence being based on a distance between the boundary point and an edge point associated with at least one of the plurality of edges of the edge map;
    a classification unit configured to determine a classification of the boundary point based on the computed confidence;
    a quality assessment unit configured to determine an accuracy characteristic associated with the original boundary segmentation and to provide an indication that a quality of the original boundary segmentation falls below a given accuracy based on the accuracy characteristic;
    a generation unit configured to generate an updated boundary segmentation based on the classification the boundary point; and
    a second interface configured to output the updated boundary segmentation.

12. The system of claim 11, wherein the classification unit comprises a determination unit for determining a classification of at least one of the boundary points, wherein the determination unit is arranged to determine whether the confidence exceeds a predetermined threshold or to determine a position of the confidence on a given scale.

13. The system of claim 11, wherein the image data is three-dimensional image data.

14. A non-transitory computer readable storage medium comprising a set of computer-readable instructions stored thereon which, when executed by at least one processor cause the processor to update a boundary segmentation, the instructions comprising:
    receiving image data and an original boundary segmentation comprising a plurality of boundary points;
    determining an accuracy characteristic associated with the original boundary segmentation;
    providing an indication that a quality of the original boundary segmentation falls below a given accuracy based on the accuracy characteristic;
    detecting a plurality of edges in the image data to generate an edge map;
    computing a confidence for a boundary point in the original boundary segmentation, the confidence being based on a distance between the boundary point and an edge point associated with at least one of the plurality of edges of the edge map;
    determining a classification of the boundary point based on the computed confidence;
    generating an updated boundary segmentation based on the classification of the boundary point; and
    outputting the updated boundary segmentation.

* * * * *